United States Patent [19]

Barsotti et al.

[11] Patent Number: 5,369,153
[45] Date of Patent: Nov. 29, 1994

[54] ACID-EPOXY-MELAMINE COATING COMPOSITION MODIFIED WITH A SILANE POLYMER

[75] Inventors: Robert J. Barsotti, Franklinville, N.J.; Jeffery W. Johnson, Rochester Hills, Mich.

[73] Assignee: E. I. du Pont de Nemours and Company, Wilmington, Del.

[21] Appl. No.: 977,866

[22] Filed: Nov. 17, 1992

[51] Int. Cl.⁵ .............. C08K 5/01; C09D 133/06; C09D 143/04; C09D 163/00
[52] U.S. Cl. .................. 523/429; 523/433; 523/435; 523/455; 525/101
[58] Field of Search .......... 523/429, 433, 455, 435; 525/101

[56] References Cited

U.S. PATENT DOCUMENTS

| | | | |
|---|---|---|---|
| 4,681,811 | 7/1987 | Simpson | 528/112 |
| 4,871,806 | 10/1989 | Shalati | 525/111 |
| 4,975,488 | 12/1990 | Furukawa | 525/101 |
| 5,039,385 | 8/1991 | Tominaga | 523/425 |
| 5,069,767 | 12/1991 | Tominaga | 523/425 |
| 5,162,426 | 11/1992 | Hazan | 525/101 |

*Primary Examiner*—John C. Bleutge
*Assistant Examiner*—D. R. Wilson
*Attorney, Agent, or Firm*—Chris P. Konkol

[57] ABSTRACT

A coating composition useful for a finish for automobiles and trucks in which the film forming binder comprises an acrylic polymer having at least two reactive acid groups, an epoxy-containing crosslinker, a melamine resin, and an epoxy-silane modifying agent. The composition may be used as a one-package system with a reasonable pot life. The composition is characterized by improved environmental resistance.

10 Claims, No Drawings

ACID-EPOXY-MELAMINE COATING COMPOSITION MODIFIED WITH A SILANE POLYMER

FIELD OF THE INVENTION

This invention is related to a coating composition comprising an acid-epoxy-melamine composition modified with a silane polymer.

BACKGROUND

There are a wide variety of coating compositions available for finishing automobiles and trucks. Various coating compositions comprising anhydride-epoxy or acid-epoxy containing compositions are known. For example, U.S. Pat. No. 4,906,677 discloses a composition comprising an acrylic anhydride polymer, a glycidyl component, and a phosphonium catalyst. U.S. Pat. No. 4,681,811 discloses a composition comprising a polyepoxide and a polyacid curing agent.

A problem with present coating compositions for automobiles and trucks, or parts thereof, is that durability is not as good as desired. An important aspect of durability is environmental resistance. The present invention offers a high quality finish exhibiting superior environmental resistance. Another problem with epoxy-containing systems has been that, due to limited pot life, they have been used as a two package system, which packages are conventionally mixed shortly before use. The present composition is a potential one-package system. Such a coating composition exhibits excellent adhesion to the substrate to which it is applied, good outdoor weatherability, etch resistance, and gloss.

SUMMARY OF THE INVENTION

An essentially anhydride-free coating composition containing 20–80% by weight of binder components and 80–20% by weight of solvent. The binder contains, as separate molecules or components of the mixture, the following:
(a) an acid polymer having at least two acid (carboxyl) groups and having a weight average molecular weight of about 2,000–50,000;
(b) an epoxy component having at least two reactive glycidyl groups;
(c) a melamine crosslinker;
(d) an acrylosilane polymer; and
(e) an effective amount of a curing catalyst.

In one embodiment of the invention, the acrylosilane polymer has reactive epoxy groups as well as silane groups.

DETAILED DESCRIPTION OF THE INVENTION

The composition of the present invention forms a durable environmental resistant coating. The composition is especially useful for finishing the exterior of automobiles and trucks.

The composition can also be pigmented to form a colored finish, although the composition is especially useful as a clearcoat.

Preferably, the coating composition has a high solids content and contains about 20–80% by weight binder and 20–80% by weight of organic solvent. The binder of the composition contains about 25–90%, preferably 35 to 65% by weight of binder, of an acid polymer containing at least two acid groups; 5–30%, preferably 10 to 20% by weight of binder, of a glycidyl containing component; 5–30%, preferably 10–20% of polymer comprising silane groups and optionally epoxy groups; and 2–15% of a polymeric melamine resin, preferably 3–9% by weight of binder.

Optionally, the composition may, in addition, comprise 5–30%, preferably 10 to 25% by weight of binder of an acrylic or a polyester or a polyester urethane which may contain hydroxyl and/or acid functionality. If hydroxy functional, the hydroxy number is 20 to 120. If acid functional, the acid number is 20 to 120. The binder should contain a maximum of 25%, based on the weight of the binder of aromatic vinyl.

The acid polymer employed in preparing the present composition has a weight average molecular weight of about 2,000–50,000, determined by gel permeation chromatography using polymethyl methacrylate as a standard. Preferably the acid polymer has a weight average molecular weight of 3,000–25,000.

The acid polymer may be prepared by conventional techniques in which the monomers, solvent, and conventional catalysts such as t-butyl perbenzoate are charged into a polymerization vessel and heated to about 75°–200° C. for about 0.5–6 hours to form the polymer.

The acid polymer can be formed by polymerizing monomers of alkyl methacrylates, or alkyl acrylates or mixtures thereof, where the alkyl groups have 1–12 carbon atoms, preferably 1–6 carbon atoms, and ethylenically unsaturated acids. Optionally, the acid functional polymer can also contain other components such as styrene, methyl styrene, and/or acrylonitrile, methacrylonitrile in amounts of about 0.1–50% by weight.

Typically useful ethylenically unsaturated acids are acrylic acid, methacrylic acid, itaconic acid, maleic acid, isobutenyl succinic acid, and the like.

This acid resin may also contain hydroxyl functionality by using monomers such as hydroxyethylacrylate, hydroxyethyl methacrylate and hydroxypropyl acrylate. The hydroxy functionality may be introduced by a post reaction of the acid with epoxy containing compounds such as Cardura E® from Shell Chemical Company (a glycidyl ester of versatic acid) and propylene oxide.

Typical alkyl acrylates and methacrylates that can be used to form the acid acrylic polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

Other components that can be used to form the acid acrylic polymer are acrylamide and methacrylamide.

It is also possible to impart the acid functionality to the acid acrylic polymer by using an ethylenically unsaturated acid anhydride which can be converted completely or substantially completely to the corresponding add polymer.

A preferred acid acrylic polymer comprises styrene, butyl methacrylate, n-butyl acrylate, and methacrylic acid.

The epoxy component preferably contains at least two glycidyl groups and can be an oligomer or a polymer. Typical glycidyl components are sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanurates, such as Denecol EX301 ® from Nagase. Sorbitol polyglycidyl ethers, such as DCE-358 ® from Dixie, Inc., and di- and polyglycidyl esters of acids, such as Araldite CY-184 ® from Ciba-Geigy or XUS-71950 ® from Dow Chemical form high quality finishes. Cycloaliphatic epoxies such as CY-179 ® from Ciba-Geigy may also be used.

Glycidyl methacrylate or acrylate containing acrylic polymers can be used, such as random and block polymers of glycidyl methacrylate/butyl methacrylate. The block polymers can be prepared by anionic polymerization or by group, transfer polymerization.

The melamine crosslinker is suitably a conventionally known alkylated melamine formaldehyde resin that is partially or fully alkylated, for example a methylated and butylated or isobutylated melamine formaldehyde resin that has a degree of polymerization of about 1–5. Polymeric melamines are preferred because they are catalyzed by weak acids such as carboxylic acids versus strong acids such as sulfonic acids and are not hindered by amines.

The silane polymer portion of the binder has a weight average molecular weight of about 1000 to 30,000. (All molecular weights disclosed herein are determined by gel permeation chromatography using a polystyrene standard.) The silane polymer is suitably the polymerization product of about 5–70%, preferably 40–60%, by weight of polymer, of ethylenically unsaturated silane containing monomers, and 30–95%, preferably 40–60%, by weight of non-silane containing monomers. Suitably non-silane containing monomers are the alkyl acrylates and alkyl methacrylates mentioned above with respect to the acid polymer, as well as styrene, methyl styrene, acrylamide, acrylonitrile, methacrylonitrile, and the like.

In addition to alkyl acrylates or methacrylates, other non-silane-containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

A suitable silane containing monomer useful in forming an acrylosilane polymer is an alkoxysilane having the following structural formula:

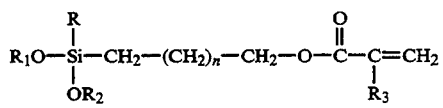

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gammaacryloxypropyltrimethoxy silane and the methacrylatoalkoxy silanes, such as gamma-ethacryloxypropyltrimethoxy silane, and gamma-methacryloxypropyltris(2-methoxyethoxy) silane.

Other suitable alkoxy silane monomers have the following structural formula:

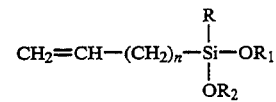

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of the above-mentioned silane-containing monomers are also suitable.

Consistent with the above mentioned components of the silane polymer, an example of an organosilane polymer useful in the coating composition of this invention may contain the following constituents: about 15–25% by weight styrene, about 30–60% by weight methacryloxypropyltrimethoxy silane, and about 25–50% by weight trimethylcyclohexyl methacrylate.

One preferred acrylosilane polymer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

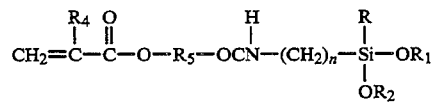

wherein R, $R_1$, and $R_2$ are as described above; $R_4$ is H or $CH_3$, $R_5$ is an alkylene group having 1–8 carbon atoms and n is a positive integer from 1–8.

Curing catalysts for catalyzing the crosslinking between silane moieties of a silane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catalyzing silane bonding.

In one embodiment of the present invention, the silane polymer optionally also has epoxy groups, that is, a portion of the monomers reacted to form the polymer contain an epoxy group. An example of a suitable epoxy functional monomer is glycidyl methacrylate and the like. Suitably, the silane polymer may be the reaction product of a monomer mixture comprising up to 40% by weight of an epoxy functional monomer, preferably 5 to 20%, and most preferably 10 to 15% by weight of an epoxy functional monomer.

As indicated above, the binder of the present composition may further comprise from about 5 to 30%, preferably 10 to 25%, based on the weight of the binder, of an acrylic or polyester or a polyester urethane or copolymer thereof having a hydroxy number of about 20 to 120, preferably 70 to 100, or an acid number of about 20 to 120, preferably 75 to 95. This polymer has a weight average molecular weight of about 2,000 to 20,000, preferably 4,000–10,000. Unless otherwise indicated, all molecular weights mentioned herein are measured using gel permeation chromatography using polymethyl methacrylate as a standard.

Polyester urethanes are a reaction product of a hydroxyl terminated polyester component and a polyisocyanate component, preferably, an aliphatic or cycloaliphatic diisocyanate. A polyester, which may be used alone or as a component of the polyester urethane, may be suitably prepared from linear or branched chain diols, including ether glycols, or mixtures thereof or mixtures of diols and triols, containing up to and including 8 carbon atoms, or mixtures of such diols, triols, and polycaprolactone polyols, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid.

Representative saturated and unsaturated polyols that can be reacted to form a polyester include alkylene glycols such as neopentyl glycol, ethylene glycol, propylene glycol, butane diol, pentane diol, 1,6-hexane diol, 2,2-dimethyl- 1,3-dioxolane-4-methanol, 1,4-cyclohexane dimethanol, 2,2-dimethyl 1,3-propanediol, 2,2-bis(-hydroxymethyl)propionic acid, and 3-mercapto-1,2-propane diol. Preferred are 1,6-hexanediol and butylene glycol.

Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

Polycaprolactone polyols may be also be used in making the polyester. A preferred polycaprolactone, a triol, is Tone® FCP 310 (available from Union Carbide).

The carboxylic acids used in making the polyester component of the polyester urethane include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid, 1,3 or 1,4-cyclohexane dicarboxylic acid and the like. A preferred acid is adipic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form the polyester urethane are as follows: isophorone diisocyanate which is 3-isocyanatemethyl-3,5,5-trimethyl-cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethlyene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like, meta-phenylene diisocyanate, para-phenylene diisoxyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like: 2,2′-biphenylene diisocyanate, 3,3′-biphenylene diisocyanate, 4,4′-biphenylene diisocyanate, 3,3′-dimethyl-4,4′-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2′-oxydiphenyl diisocyanate, 3,3′-oxydiphenyl diisocyanate, 4,4′-oxydiphenyl diisocyanate, 2,2′-ketodiphenyl diisocyanate, 3,3′-ketodiphenyl diisocyanate, 4,4′-ketodiphenyl diisocyanate, 2,2′-thiodiphenyl diisocyanate, 3,3′-thiodiphenyl diisocyanate, 4,4′-thiodiphenyl diisocyanate, and the like; 2,2′-sulfonediphenyl diisocyanate, 3,3′-sulfonediphenyl diisocyanate, 4,4′-sulfonediphenyl diisocyanate, and the like; 2,2,-methylene-bis(cyclohexyl isocyanate), 3,3′-methylene-bis(cyclohexyl isocyanate), 4,4′-methylene-bis(cyclohexyl isocyanate), 4,4′-ethylene-bis(cyclohexyl isocyanate), 4,4′-propylene-bis-(cyclohexyl isocyanate), bis(paraisocyano-cyclohexyl)sulfide, bis(para-isocyano-cyclohexyl)sulfone, bis(para-isocyano-cyclohexyl)ether, bis(para-isocyano-cyclohexyl)diethyl silane, bis(para-isocyano-cyclohexyl)diphenyl silane, bis(para-isocyano-cyclohexyl)ethyl phosphine oxide, bis(para-isocyano-cyclohexyl)phenyl phosphine oxide, bis(para-isocyano-cyclohexyl)N-phenyl amine, bis(para-isocyano-cyclohexyl)N-methyl amine, 3,3′-dimethyl-4,4′-diisocyano biphenyl, 3,3′-dimethoxy-biphenylene diisocyanate, 2,4-bis(b-isocyano-t-butyl)toluene, bis(para-b-isocyano-t-butyl-phenyl)ether, para-bis(2-methyl-4-isocyanophenyl)benzene, 3,3-diisocyano adamantane, 3,3-diisocyano biadamantane, 3,3-diisocyanoethyl-1′-biadamantane, 1,2-bis(3-isocyano-propoxy)ethane, 2,2-dimethyl propylene diisocyanate, 3-methoxy-hexamethylene diisocyanate 2,5-dimethyl heptamethylene diisocyanate, 5-methyl-nonamethylene diisocyanate, 1,4-diisocyano-cyclohexane, 1,2-diisocyano-octadecane, 2,5-diisocyano-1,3,4-oxadiazole, $OCN(CH_2)_3O(CH_2)_2O(CH_2)_3NCO$, $OCN(CH_2)_3NCO$ or the following:

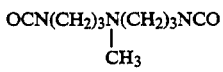

Aliphatic diisocyanates are preferred, forming urethanes that have excellent weatherability. One aliphatic diisocyanate that is particularly preferred is trimethyl hexamethylene diisocyanate.

A preferred polyester urethane is the reaction product of trimethylhexamethylene diisocyanate and a hydroxy terminated polyester of 1,3-butylene glycol, 1,6-hexanediol, adipic acid, trimethylolpropane, and Tone® FCP 310.

It is noted that a hydroxy functional polyester urethane can be converted to the corresponding acid functional polyester urethane by reaction with methylhexahydropthalic anhydride or other mono-anhydride such as succinic anhydride. Converting the hydroxy to the acid may result in longer pot life.

A polyester may be prepared by conventional techniques in which the component polyols and carboxylic acids and solvent are esterified at about 110° C.–250° C. for about 1–10 hours to form a polyester. To form a polyester urethane, a diisocyanate may then be added and reacted at about 100° C. for about 15 minutes to 2 hours.

In preparing the polyester urethane, a catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1–5% by weight of catalyst, based on the total weight of the reactants, is typically used.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,759, hereby incorporated by reference.

Another optional component of the present composition is the half ester of an anhydride compound, as distinguished from a polymer, for example the reaction product of an acid anhydride such as hexahydrophthalic anhydride or a succinic anhydride, which may be substituted, for example with a $C_1$–$C_8$ alkyl group, with a monofunctional or polyfunctional alcoholic solvent such as methanol or ethylene glycol. A preferred half ester is the reaction product of methylhexahydrophthalic anhydride and an alcohol. Other alcoholic solvents are propanol, isobutanol, isopropanol, tertiary butanol, n-butanol, propylene glycol monomethyl ether, ethylene glycol monobutyl ether, and the like. Such half esters are useful for boosting the solids content of the composition. More particularly, such a half ester is chosen to be a good solvent for the preferred phosphonium catalyst. The half ester is suitably present in the mount of 2 to 25 percent by weight of binder, preferably 4–12 percent.

About 0.1–5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N¹,N¹-tetramethylethylenediamine, N-methyldiethanolamine, N,N-dimethyl-1,3-propanediamine and 1-dimethylamino-2-propanol or quaternary ammonium salts such as tert-butyl ammonium bromide, benzyl trimethyl ammonium formate and the like. Preferred catalyst, however, are phosphonium compounds such as are disclosed in U.S. Pat. No. 4,906,677, hereby incorporated by reference in its entirety.

Typical solvents used as a diluent for the coating composition include toluene, xylene, butyl acetate, ethyl benzene, higher boiling aromatic hydrocarbons, amyl acetate, ethyl acetate, propyl acetate, ethylene or propylene glycol mono alkyl ether acetates.

Generally, the present composition is applied as a coating to a substrate by conventional techniques such as spraying and electrostatic spraying. The composition may be applied as a one-package system. The resulting coating can be dried and cured at elevated temperatures of 100° to 200° C. Coatings are applied to form a finish typically about 0.5–5 mils thick, and preferably 1–2 mils thick.

To improve the pot life or stability of the composition it is desirable to include a trialkyl orthoacetate or orthoformate, wherein the alkyl group has 1–6 carbon atoms. Preferred compounds are trimethyl or triethyl orthoacetate. A suitable range of such a stabilizer is 1 to 6% by weight of composition, preferably about 3 to 4% by weight. Such a stabilizer also serves to keep the viscosity of the composition low.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are listed in U.S. Pat. No. 4,906,677, previously incorporated by reference. Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1 -phenyl-3-methyl-4-decanoyl-pyrazolate(5)]-Ni, bis[phenyldithiocarbamato]-Ni(II), and others listed in the above patent, column 8, line 44 through line 55.

An applicable blend of ultraviolet light stabilizers comprises 2-[2'-hydroxy-3',5'-1(1-1-dimethyl-propyl )phenyl]benzotriazole and bis-[4-(1,2,2,6,6-pentamethyl-piperidyl)]2-butyl-2-[(3,5-t-butyl-4-hydroxyphenyl)methyl]propanedioate. Although the stabilizers can be employed in any ratio, a 1:1 ratio of benzotriazole to propanedioate is preferred.

The composition can be pigmented to form a colored finish or primer. About 0.1–200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The present composition can be used in a one-package system with a pot life of up to several weeks, depending on conditions.

The following examples illustrate the invention. All parts and percentages are on a weight basis unless otherwise indicated. The weight average molecular weight of polymers was determined by GPC (gel permeation chromatography) using polyethyl methacrylate as a standard, unless stated otherwise.

EXAMPLE 1

This example illustrates, as a component for use in the present composition, an acid polymer, more specifically a methacrylic acid resin, which may be prepared by charging the following constituents into a reactor equipped with a thermometer, stirrer, dropping funnel, and condensor:

|  | Parts by Weight |
|---|---|
| Portion 1 | |
| Propylene glycol monomethyl ether acetate (PM acetate) | 155.3 |
| Xylene | 103.5 |
| Portion 2 | |
| n-Butyl methacrylate | 174.8 |
| Methacrylic acid | 97.1 |
| Butyl acrylate | 140.8 |
| Styrene | 72.8 |
| Portion 3 | |
| Tertiarybutyl peroxyacetate | 35.0 |
| Propylene glycol monomethyl ether acetate (PM acetate) | 41.7 |
| Xylene | 27.8 |
| Total | 849.0 |

Portion 1 was charged into the reactor and heated to its reflux (approximately 140° C). Portion 2 was premixed and added to the reactor dropwise over a 240 minute period. Portion 3 was premixed and added to the reactor over a 270 minute period concurrent with Portion 3. After the addition was complete, the reactor was held at reflux and filled out.

The resulting acid polymer composition had a composition of 15% styrene, 36% butyl methacrylate, 29% n-butyl acrylate, and 20% methacrylic acid. The solids content was 60% and the polymer had a Gardner-Holdt viscosity of Z-1. The polymer had a weight average molecular weight of 5000.

EXAMPLE 2

This example illustrates one embodiment of an acrylosilane polymer which may be employed in a composition according to the present invention. A solution of the polymer is prepared by charging the following constituents into a polymerization reactor equipped with a heat source and a reflux condensor:

|  | Parts by Weight |
|---|---|
| Portion I | |
| "Solvesso" 100 | 75.00 |
| Portion II | |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III | |
| 2,2'-azobis(2-methyl) butanenitrile | 57.32 |
| "Solvesso" 100 | 85.80 |

|  | Parts by Weight |
|---|---|
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 3

This example illustrates an epoxy-silane polymer, more particularly an epoxy functional acrylosilane polymer which was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135–145° C.) | 363.2 |
| "Aromatic" 100 | 363.2 |
| Portion 2 | |
| Styrene | 530.9 |
| gamma-Methacryloxypropyl trimethoxy silane | 1380.3 |
| Methyl methacrylate | 318.5 |
| Butyl methacrylate | 79.6 |
| 2-Ethylhexyl acrylate | 79.6 |
| Glycidyl methacrylate | 265.4 |
| Aromatic 100 | 40.9 |
| Xylol | 40.9 |
| Portion 3 | |
| t-Butyl peroxyacetate | 132.7 |
| Aromatic 100 | 99.6 |
| Xylol | 99.7 |
| TOTAL | 3794.5 |

Portion 1 was charged into the polymerization vessel and heated under nitrogen to 149° C. Portion 2 was then added over 360 minutes and Portion 3 over 420 minutes to the vessel. The resulting polymer solution had the following characteristics:

| Gallon wt. | 8.56 lbs./gal. |
|---|---|
| % wt. solids | 72.2% |
| % volume solids | 68.6 |
| $M_w$ of polymer | 5000 |
| $M_n$ of polymer | 1650 |

The polymer composition was, by weight, 20 percent styrene, 52 percent gamma-methacryloxylpropyl trimethoxy silane (A-174 commercially available from Union Carbide, Inc., Danbury, Conn.), 12 percent methyl methacrylate, 3 percent butyl methacrylate, 3 percent 2-ethylhexyl acrylate, and 10 percent glycidyl methacrylate, represented as follows: STY/A-174/MMA/BMA/2-EHA/GMA in the ratio of 20/52/12/3/3/10.

EXAMPLE 4

This example illustrates, as an optional component for a composition according to the present invention, a polyester urethane solution which may be prepared by charging the following constituents in order into a reaction vessel equipped with a stirrer, a heating source and a reflux condenser:

|  | Parts by Weight |
| --- | --- |
| Portion 1 | |
| 1,3-butylene glycol | 173.4 |
| 1,6-hexanediol | 163.1 |
| Trimethylol propane | 78.8 |
| Adipic acid | 403.7 |
| Toluene | 20.0 |
| Portion 2 | |
| Propylene glycol monomethyl ether acetate | 294.4 |
| Portion 3 | |
| Tone ® FCP 310 (caprolactone polyol from Union Carbide) | 934.9 |
| Propylene glycol monomethyl ether acetate | 185.3 |
| Hydrocarbon solvent | 706.1 |
| Portion 4 | |
| trimethylhexamethylene diisocyanate | 290.3 |
| dibutyl tin dilaurate | 0.5 |
| Portion 5 | |
| Hydrocarbon solvent | 69.8 |
| Total | 3320.3 |

Portion 1 is charged in order into the reaction vessel, and the constituents of Portion 1 are heated to distill water at 140°-230° C. The distillation is continued until the acid number is 6.5 to 8.5. The product is thinned and cooled to 98° to 102° C. by charging Portion 2 into the vessel. While the constituents in the vessel are maintained at the above temperature, Portion 3 was charged to the reactor in order. Portion 4 is added to the composition at a uniform rate over a 30 minute period while the batch temperature is maintained at 98°-102° C. A sample is removed and tested for unreacted isocyanate NCO by infrared analysis. The composition is held at the above temperature until there is no unreacted isocyanate in the composition. Portion 5 then is added as a rinse and the resulting composition was allowed to cool to ambient temperatures.

Following this procedure, the resulting composition had a polymer weight solids content of about 61.0%. The polyester urethane had a Gardner-Holdt viscosity of L. The $M_n$ (number average molecular weight) was 3734.0 and the $M_w$ (weight average molecular weight) was 7818.0 (by gel permeation chromatography using polystyrene as the standard). The acid content was determined to be 4.9 Meq/g. The hydroxy number was 92.

EXAMPLE 5

This example illustrates a clearcoat coating composition according to the present invention. The following was thoroughly blended:

| Components | Parts |
| --- | --- |
| Acid Resin (prepared as described above) | 35.1 |

-continued

| Components | Parts |
| --- | --- |
| Propylene glycol monomethyl ether acetate | 27.28 |
| DISLON 1984 acrylic flow additive (50%) in xylene, from King Industries | 0.17 |
| XU-71950 (diglycidylester from Dow) | 10.04 |
| Catalyst solution | 5.92 |
| CYMEL 325 (Melamine) | 4.76 |
| Epoxy-silane polymer (prepared as described above) | 10.92 |
| TINUVIN 384 (UV Screener from Ciba-Geigy) | 0.72 |
| TINUVIN 123 (HALS from Ciba-Geigy) | 0.53 |
| Trimethyl orthoacetate | 4.56 |
| TOTAL | 100.00 |

In the above list, fully capitalized names indicate trademarks of commercially available products. The UV screener and hindered amine light stabilizer (HALS) are commercially available from Ciba-Geigy as indicated above. The catalyst solution refers to a solution of benzyl triphenyl phosphonium chloride, which may be prepared from a mixture of 62.8 parts of ethylene glycol-MHHPA half-ester, 29.9 parts of xylene, and 7.3 parts of benzyl triphenyl phosphonium chloride, in which the solution was heated to 50°-60° C. to dissolve the phosphonium chloride catalyst. The MHHPA half-ester was prepared as follows: 578.7 parts of methyl hexahydrophthalic anhydride and 249.7 parts of xylene were heated to 160° F. and 106.2 parts of ethylene glycol were added over 45 minutes. After the feed was complete, the reaction was maintained at 250°±10° F. for 5 hours to complete the reaction. Finally, the reaction product was cooled to 150° F. and 8.8 parts of methanol was added. The mixture was stirred for 60 minutes and heated to reflux to remove solvent, cooled to 160° F., and filtered (75 weight percent solids).

The coating composition was sprayed onto primed metal panels coated with a basecoat and cured at 265° F. The coating exhibited excellent humidity resistance, chemical resistance, durability and other film properties.

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

We claim:

1. A clearcoat composition which is essentially anhydride-free comprising 20-80% by weight of reactive binder components and 80-20% by weight of an organic liquid carrier; wherein the binder comprises:
   (a) 25-90% by weight, based on the weight of the binder, of an acrylic copolymer having at least two reactive acid groups and comprising polymerized monomers of an ethylenically unsaturated monoacid or an ethylenically unsaturated dicarboxylic acid and polymerized monomers selected from the group consisting of alkyl methacrylate, alkyl acrylate and any mixtures therof, wherein the alkyl groups have 1-8 carbon atoms and the polymer has a weight average molecular weight of about 2,000-50,000;
   (b) 5-30% by weight, based on the weight of the binder, of a glycidyl ether or ester or cycloaliphatic epoxy compound containing at least two reactive glycidyl groups;

(c) 5–30% by weight, based on the weight of the binder, of an alkylated melamine formaldehyde resin that is partially or fully alkylated and has a degree of polymerization of about 1 to 5; and (d) 10–30% by weight, based on the weight of the binder, of an acrylosilane polymer which is the polymerization product of about 5–70% by weight ethylenically unsaturated alkoxysilane containing monomers, based on the weight of the polymer, and having a number average molecular weight of 500–10,000; and (e) an effective amount of a curing catalyst selected from the group consisting of tertiary amines quaternary ammonium salts, and phosphonium compounds, wherein components (a), (b), (c) and (d) are different components.

2. The coating composition of claim 1, wherein the glycidyl component comprises a di- or polyglycidyl ether of a polyol or a di-or polyglycidyl ester of a di- or polycarboxylic acid.

3. The coating composition of claim 1 in which the glycidyl component is selected from the group consisting of a polyglycidyl ether of low molecular weight polyol, an epoxy resin of epichlorohydrin and bisphenol A, a polyglycidyl ester of a polycarboxylic acid, a polyglycidyl ether of isocyanurate, a glycidyl methacrylate or glycidyl acrylate containing acrylic polymer, and mixtures of any of the above.

4. The coating composition of claim 1, in which the acid acrylic polymer comprises polymerized monomers of styrene, alkyl methacrylate or an alkyl acrylate having 2–4 carbon atoms in the alkyl group, and ethylenically unsaturated acid or ethylenically unsaturated dicarboxylic acid.

5. The coating composition of claim 1, in which the acid acrylic polymer consists of polymerized monomers of maleic acid or itaconic acid.

6. The coating composition of claim 1, wherein component (d) is an epoxy-functional acrylosilane polymer.

7. The composition of claim 1, further comprising an effective amount of an alkyl orthoacetate.

8. The coating composition of claim 1, wherein the catalyst is a phosphonium compound.

9. A substrate coated with a cured layer of the composition of claim 1.

10. The substrate of claim 9, wherein said substrate is plastic or metal.

* * * * *